Dec. 22, 1942.  C. MALLORY  2,306,174
SERVICE-RECORD HOLDER
Filed May 20, 1941
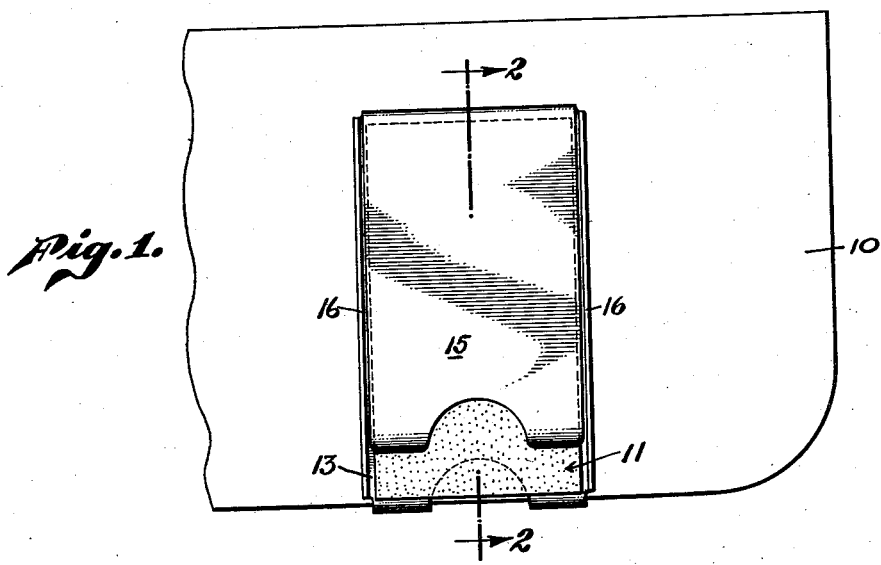
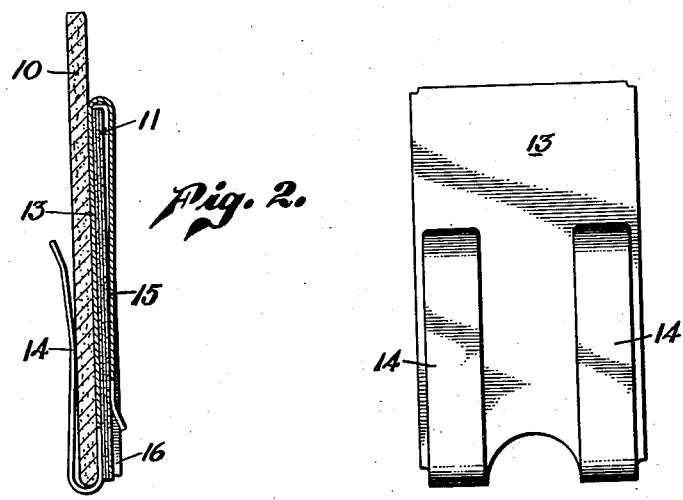
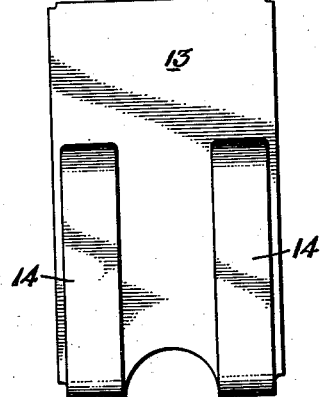
Inventor
Clyde Mallory
By
Attorney Patented Dec. 22, 1942

2,306,174

UNITED STATES PATENT OFFICE 2,306,174

SERVICE-RECORD HOLDER

Clyde Mallory, Alhambra, Calif.

Application May 20, 1941, Serial No. 394,293

1 Claim. (Cl. 24—81)

This invention relates to devices for holding service records, and more particularly to a device for holding a chart or record of the various periodical lubrications performed on an automobile, and the mileage at which the various services were performed.

Various expedients have been devised for the preservation of the record of the various operations performed on an automobile, such as mounting the record in the door jamb or other out of the way places. But it has been found that unless the record is in such a location that it comes under the eye of the driver at frequent intervals, it is often forgotten with the result that service of the automobile is neglected. At the same time, constant obtrusion of the record under the eye of the driver is apt to be annoying, as the records are often filled out in pencil, and detract from the otherwise attractive appearance of the interior of the vehicle.

It is therefore an object of the present invention to provide a service record which is readily available in a position where it is not likely to be forgotten, and which is, at the same time, not unattractive.

It is a further object of the present invention to provide a service record holder which can be applied to any automobile in a manner which will not detract from the appearance of the interior of the car, and which can be readily reached by the attendant at the service station without requiring that the doors be opened.

It is a further object of the present invention to provide a service record holder which can accommodate the various service record cards or booklets furnished by service stations.

It is a further object of the present invention to provide a service record holder which can be supported within the automobile without the use of fastening screws of any kind.

This invention possesses many other advantages, and has other objects which may be made more easily apparent from a consideration of one embodiment of the invention. For this purpose there is shown a form in the drawing accompanying and forming part of the present specification. This form will now be described in detail, illustrating the general principles of the invention; but it is to be understood that this detailed description is not to be taken in a limiting sense, since the scope of the invention is best defined by the appended claim.

Referring now to the drawing:

Figure 1 is an elevational view showing one form of the present invention in place on the sun visor of an automobile;

Figure 2 is a sectional view taken along line 2—2 of Figure 1; and

Figure 3 is a rear elevation of the record holder shown in Figure 1.

It is intended to apply the record holder of the present invention to a sun visor of an automobile. At present the interiors of cars are universally provided with sun visors, which are normally hinged to lie flat against the ceiling of the car when not in use, and which are intended to be lowered into operative position when driving into the sun. In the drawing a visor 10 is illustrated in the position in which it is placed to shade the eyes of the driver from the sun. When in this position, the record holding position of the holder is on the side of the visor facing the driver of the car.

The service record is in the form of a card or booklet 11, having places for entries when services are performed in connection with the car, and the construction of the holder is such as to retain the record securely in place, while at the same time permitting its ready removal. The holder comprises a base portion 13 having a spring clip 15 on one side which cooperatively with the base forms a pocket for receiving the booklet or card 11, the spring clip 15 serving to secure the record against removal. The base 13 also has one or more spring clips 14 on its opposite side which are intended to grip the lower edge portion of the visor 10 to secure the record thereto. In the form shown, the clips 14 and 15 are formed by bending the ends of a strip of sheet metal back upon opposite sides of the intermediate portion which forms the base of the holder. Of course, the clips could be made separately and secured to the base in any suitable manner. The spring clip 15 will prevent the record 11 from falling out of the pocket regardless of the position of the holder on the visor. However, in order to prevent the booklet from working out at the sides of the pocket, and at the same time give the base member 13 some degree of rigidity, the side edges of the base are preferably bent upwardly, forming retaining walls 16, extending along the sides of the spring clip 15. Both the spring clip 15 and the base member 13 may be provided with notches in their ends to permit easy removal of the booklet 11 from the holder.

As hereinbefore explained, the device is adapted to be clipped to the visor of an automobile in such a position that it is normally out of sight, when the visor is not in use, but is visible when the visor is swung downwardly to the position shown in Figure 1. The service record holder is therefore normally out of sight, but seen frequently enough to act as a reminder to the operator, without detracting from the interior appearance of the vehicle.

I claim:

A service record card holder comprising a base plate, a pair of spring clips extending from one end of said plate along one side of said plate to grip an automobile visor, a strip extending from the other end of said base plate along the other side of said base plate to grip a service record card, and a pair of flanges formed on the sides of the base plate, said strip passing between said flanges, whereby said strip and flanges secure said record card against removal in all directions but one.

CLYDE MALLORY.